(12) United States Patent
Karlsson et al.

(10) Patent No.: US 8,612,620 B2
(45) Date of Patent: Dec. 17, 2013

(54) CLIENT CAPABILITY ADJUSTMENT

(75) Inventors: Kent Karlsson, San Francisco, CA (US); Ulf Windisch, Älvsjö (SE); Lars Olsson, Stockholm (SE); Dag Henriksson, Spånga (SE); Niklas Westin, Saltsjö-Boo (SE)

(73) Assignee: Mobitv, Inc., Emeryville, CA (US)

( * ) Notice: Subject to any disclaimer, the term of this patent is extended or adjusted under 35 U.S.C. 154(b) by 835 days.

(21) Appl. No.: 12/101,914

(22) Filed: Apr. 11, 2008

(65) Prior Publication Data

US 2009/0259766 A1 Oct. 15, 2009

(51) Int. Cl.
*G06F 15/16* (2006.01)

(52) U.S. Cl.
USPC .............. 709/231; 709/232; 709/228

(58) Field of Classification Search
USPC ......... 709/231, 219, 217, 227–229, 232, 235, 709/236; 725/38, 39, 56, 91, 105, 109, 114, 725/115, 117, 118
See application file for complete search history.

(56) References Cited

U.S. PATENT DOCUMENTS

| | | | |
|---|---|---|---|
| 6,850,965 B2* | 2/2005 | Allen | 709/203 |
| 7,734,800 B2* | 6/2010 | Gupta et al. | 709/231 |
| 2002/0031086 A1* | 3/2002 | Welin | 370/229 |
| 2003/0093803 A1* | 5/2003 | Ishikawa et al. | 725/94 |
| 2006/0274869 A1* | 12/2006 | Morse | 375/352 |
| 2007/0250775 A1* | 10/2007 | Marsico et al. | 715/716 |
| 2008/0115185 A1* | 5/2008 | Qiu et al. | 725/118 |
| 2008/0147697 A1* | 6/2008 | Wei et al. | 707/101 |

OTHER PUBLICATIONS

Lazzaro, J., "Framing Real-Time Transport Protocol (RTP) and RTP Control Protocol (RTCP) Packets over Connection-Oriented Transport", The Internet Society, 2006. [Online]. Retrieved from the Internet: < http://tools.ietf.org/pdf/rfc2326.pdf >, 10 pgs.

Schulzrinne, H., et al., "Real Time Streaming Protocol (RTSP)", The Internet Society, 1998. [Online]. Retrieved from the Internet: < http://tools.ietf.org/pdf/rfc4571.pdf >, 93 pgs.

* cited by examiner

*Primary Examiner* — Ruolei Zong

(74) *Attorney, Agent, or Firm* — Kwan & Olynick LLP

(57) ABSTRACT

Mechanisms are provided to detect device client capabilities associated with screen size, video and audio codec support, bandwidth limitations, and memory limitations. A content server can intelligently select a media stream for transmission to the device using the client capability information for the device. In some instances, the content server presents prioritized selections to a user and the user can choose the optimal media stream.

26 Claims, 8 Drawing Sheets

| RTP Packet Stream 301 | | | | | | | | | | | | | | | | | |
|---|---|---|---|---|---|---|---|---|---|---|---|---|---|---|---|---|---|
| Timestamp 303 | 6 | 6 | 6 | 7 | 8 | 9 | 10 | 11 | 11 | 12 | 13 | 14 | 15 | 16 | 17 | 17 |
| Sequence Number 305 | 4303 | 4304 | 4305 | 4306 | 4307 | 4308 | 4309 | 4310 | 4311 | 4312 | 4313 | 4314 | 4315 | 4316 | 4317 | 4318 |
| Marker 307 | 0 | 0 | 0 | 0 | 0 | 0 | 0 | 0 | 0 | 0 | 0 | 0 | 0 | 0 | 0 | 0 |
| Data Frame 309 | I | I | I | P | B | P | P | I | I | P | P | B | P | B | I | I |

Figure 3

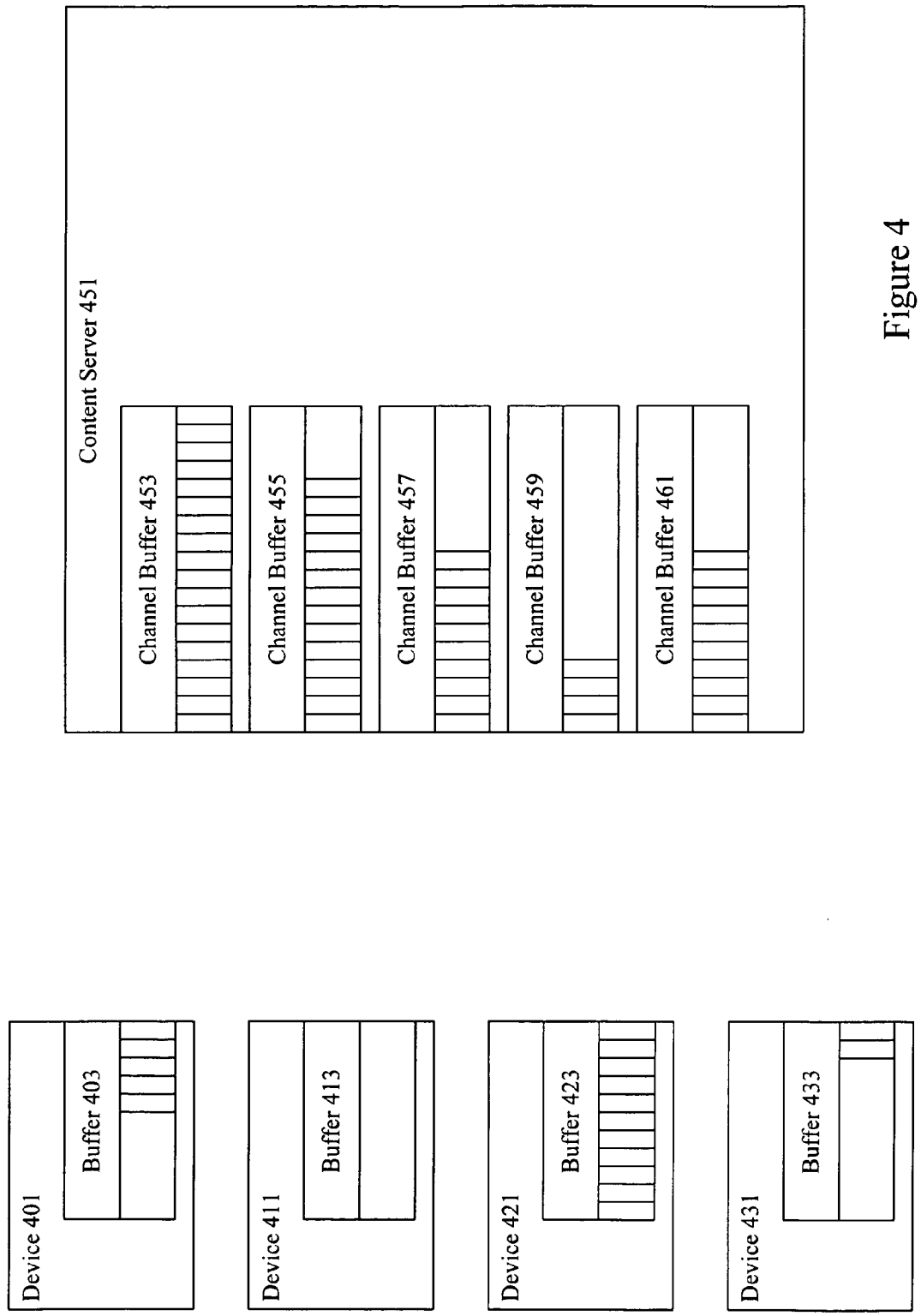

| Client Capability Management 501 | | |
|---|---|---|
| Client Identifier 511 | Media Streamss Prioritized 513 | Capability Information 515 |
| Client Identifier 521 | Media Streams Prioritized 523 | Capability Information 525 |
| Client Identifier 531 | Media Streams Prioritized 533 | Capability Information 535 |
| Client Identifier 541 | Media Streams Prioritized 543 | Capability Information 545 |
| Client Identifier 551 | Media Streams Prioritized 553 | Capability Information 555 |
| Client Identifier 561 | Media Streams Prioritized 563 | Capability Information 565 |

Figure 5

| RTP Packet Stream 601 | | | | | | | | | | | | | | | | |
|---|---|---|---|---|---|---|---|---|---|---|---|---|---|---|---|---|
| Timestamp 603 | 6 | 6 | 6 | 7 | 8 | 9 | 10 | 11 | 11 | 12 | 13 | 14 | 15 | 16 | 17 | 17 |
| Sequence Number 605 | 4303 | 4304 | 4305 | 4306 | 4307 | 4308 | 4309 | 4310 | 4311 | 4312 | 4313 | 4314 | 4315 | 4316 | 4317 | 4318 |
| Marker 607 | 0 | 0 | 0 | 0 | 0 | 0 | 0 | 0 | 0 | 0 | 0 | 0 | 0 | 0 | 0 | 0 |
| Data Frame 609 | I | I | I | P | B | P | P | I | I | P | P | B | P | B | I | I |

| RTP Packet Stream 611 | | | | | | | | | | | | | | | | |
|---|---|---|---|---|---|---|---|---|---|---|---|---|---|---|---|---|
| Timestamp 613 | 6 | 6 | 6 | 7 | 8 | 9 | 10 | 11 | 11 | 12 | 13 | 14 | 15 | 16 | 17 | 17 |
| Sequence Number 615 | 4303 | 4304 | 4305 | 4306 | 4307 | 4308 | 4309 | 4310 | 4311 | 4312 | 4313 | 4314 | 4315 | 4316 | 4317 | 4318 |
| Marker 617 | 0 | 0 | 0 | 0 | 0 | 0 | 0 | 0 | 0 | 0 | 0 | 0 | 0 | 0 | 0 | 0 |
| Data Frame 619 | I | I | I | P | B | P | P | I | I | P | P | B | P | B | I | I |

Figure 6

CLIENT CAPABILITY ADJUSTMENT

TECHNICAL FIELD

The present disclosure relates to managing client capabilities.

DESCRIPTION OF RELATED ART

Content servers provide media streams to individual devices using protocols such as the Real-Time Transport Protocol (RTP). A separate session is used to carry each content stream such as a video or audio stream. RTP specifies a standard packet format that is used to carry video and audio data such as Moving Pictures Expert Group (MPEG) video data including MPEG-2 and MPEG-4 video frames. In many instances, multiple frames are included in a single RTP packet. The MPEG frames themselves may be reference frames or may be frames encoded relative to a reference frame.

Conventional techniques and mechanisms allow a content server to transmit a media stream to a client device. However, mechanisms for selecting an optimal media stream to present to the client device are limited. Consequently, it is desirable to provide improved techniques and mechanisms for transmitting media streams from content servers to client devices.

BRIEF DESCRIPTION OF THE DRAWINGS

The disclosure may best be understood by reference to the following description taken in conjunction with the accompanying drawings, which illustrate particular embodiments.

FIG. 3 illustrates one example of an RTP stream.

FIG. 4 illustrates one example of content server having channel buffers.

FIG. 5 illustrates one example of a client capability management database.

FIG. 6 illustrates examples of multiple media streams.

DESCRIPTION OF EXAMPLE EMBODIMENTS

Figure 1:
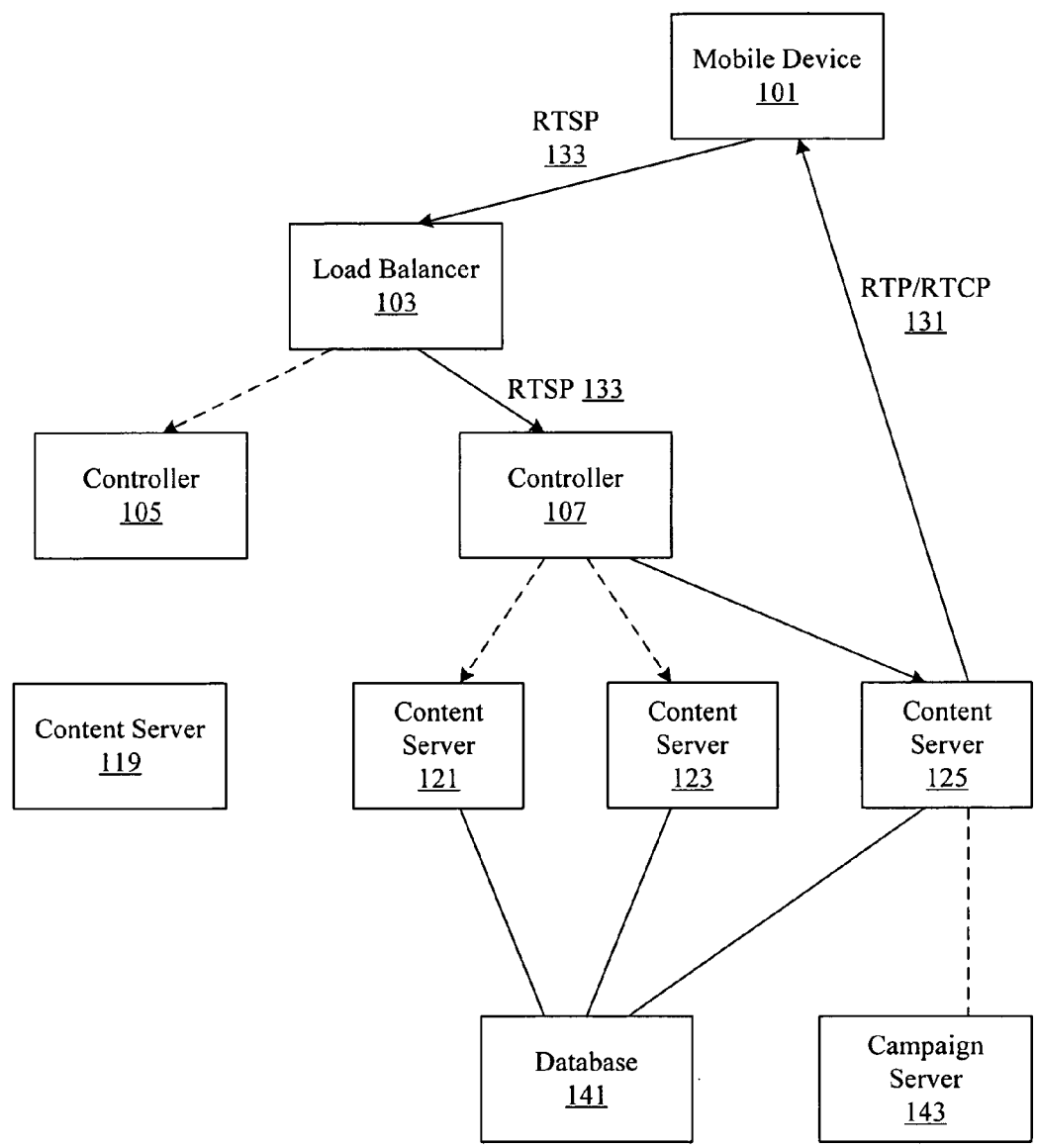
FIG. 1 illustrates an exemplary system for use with embodiments of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the Real-Time Transport Protocol (RTP) and the Real-Time Streaming Protocol (RTSP). However, it should be noted that the techniques of the present invention apply to a variations of RTP and RTSP. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided to detect device client capabilities associated with screen size, video and audio codec support, bandwidth limitations, and memory limitations. A content server can intelligently select a media stream for transmission to the device using the client capability information for the device. In some instances, the content server presents prioritized selections to a user and the user can choose the optimal media stream.

EXAMPLE EMBODIMENTS

A variety of mechanisms are used to deliver media streams to devices. In particular examples, a client establishes a session such as a Real-Time Streaming Protocol (RTSP) session. A server computer receives a connection for a media stream, establishes a session, and provides a media stream to a client device. The media stream includes packets encapsulating frames such as Moving Pictures Expert Group (MPEG) frames. The MPEG frames themselves may be key frames or differential frames. The specific encapsulation methodology used by the server depends on the type of content, the format of that content, the format of the payload, the application and transmission protocols being used to send the data. After the client device receives the media stream, the client device decapsulates the packets to obtain the MPEG frames and decodes the MPEG frames to obtain the actual media data.

In many instances, a server computer obtains media data from a variety of sources, such as media libraries, cable providers, satellite providers, and processes the media data into MPEG frames such as MPEG-2 or MPEG-4 frames. In particular examples, a server computer may encode six media streams of varying bit rates for a particular channel for distribution to a variety of disparate devices.

A user on a device such as a mobile device obtains a media stream by establishing an RTSP session. However, clients deployed on various devices have differing capabilities. Some examples of client capability characteristics include screen size, video and audio codec support, sound capabilities, bandwidth limitations, memory limitations, etc. In many implementations, content servers have to present users with multiple different streams that are tailored for different devices. In many instances, only selected streams work for particular clients and devices and a user often is burdened with the task of selecting the appropriate stream.

In some embodiments, a client feature allows a content server to present the client with a list of streams, but this requires extra intelligence in a client. Many clients do not support this feature. Consequently, the techniques and mechanisms of the present invention allow a content server to intelligently identify client capabilities and intelligently select a stream to provide to the client. According to various embodiments, an optimal stream is selected and the client does not require any intelligence or user input. In some examples, a user-agent and or other headers in the RTSP protocol are used to map a client against an entry in a database that allows the server to present the user with only compatible streams and prioritize them based on quality so that the default choice is the best for that client. In some embodiments, the default choice is automatically selected.

FIG. 1 is a diagrammatic representation illustrating one example of a system that can use the techniques and mechanisms of the present invention. According to various embodiments, content servers 119, 121, 123, and 125 are configured to provide media content to a mobile device 101 using protocols such as RTP and RTCP. Although a mobile device 101 is shown, it should be recognized that other devices such as set top boxes and computer systems can also be used. In particular examples, the content servers 119, 121, 123, and 125 can themselves establish sessions with mobile devices and stream video and audio content to mobile devices. However, it is recognized that in many instances, a separate controller such as controller 105 or controller 107 can be used to perform session management using a protocol such as RTSP. It is recognized that content servers require the bulk of the processing power and resources used to provide media content mobile devices. Session management itself may include far fewer transactions. Consequently, a controller can handle a far larger number of mobile devices than a content server can. In some examples, a content server can operate simultaneously with thousands of mobile devices, while a controller performing session management can manage millions of mobile devices simultaneously.

By separating out content streaming and session management functions, a controller can select a content server geographically close to a mobile device 101. It is also easier to scale, as content servers and controllers can simply be added as needed without disrupting system operation. A load balancer 103 can provide further efficiency during session management using RTSP 133 by selecting a controller with low latency and high throughput.

According to various embodiments, the content servers 119, 121, 123, and 125 have access to a campaign server 143. The campaign server 143 provides profile information for various mobile devices 101. In some examples, the campaign server 143 is itself a content server or a controller. The campaign server 143 can receive information from external sources about devices such as mobile device 101. The information can be profile information associated with various users of the mobile device including interests and background. The campaign server 143 can also monitor the activity of various devices to gather information about the devices. The content servers 119, 121, 123, and 125 can obtain information about the various devices from the campaign server 143. In particular examples, a content server 125 uses the campaign server 143 to determine what type of media clips a user on a mobile device 101 would be interested in viewing.

According to various embodiments, the content servers 119, 121, 123, and 125 are also receiving media streams from content providers such as satellite providers or cable providers and sending the streams to devices using RTP 131. In particular examples, content servers 119, 121, 123, and 125 access database 141 to obtain desired content that can be used to supplement streams from satellite and cable providers. In one example, a mobile device 101 requests a particular stream. A controller 107 establishes a session with the mobile device 101 and the content server 125 begins streaming the content to the mobile device 101 using RTP 131. In particular examples, the content server 125 obtains profile information from campaign server 143.

In some examples, the content server 125 can also obtain profile information from other sources, such as from the mobile device 101 itself. Using the profile information, the content server can determine whether a client device would support a burst of data. For example, the content server could determine that the client device has a particular buffer size and reports when the buffer is low or empty. When the client device supports buffer bursts, the content server can transmit available data at a higher bit rate to the client device when the client buffer is low or empty. In some instances, a content server buffer for a particular channel will be empty and nothing can be transmitted to the client. However, if the content server buffer for the particular channel has data available, a burst of data can be transmitted to replenish the client buffer. In a particular example, 8 seconds of video data is transmitted in a short amount of time. Extra packets can simply be transmitted. However, a lower quality stream selected from the same channel or from a database can also be transmitted to replenish the client buffer.

Figure 2:
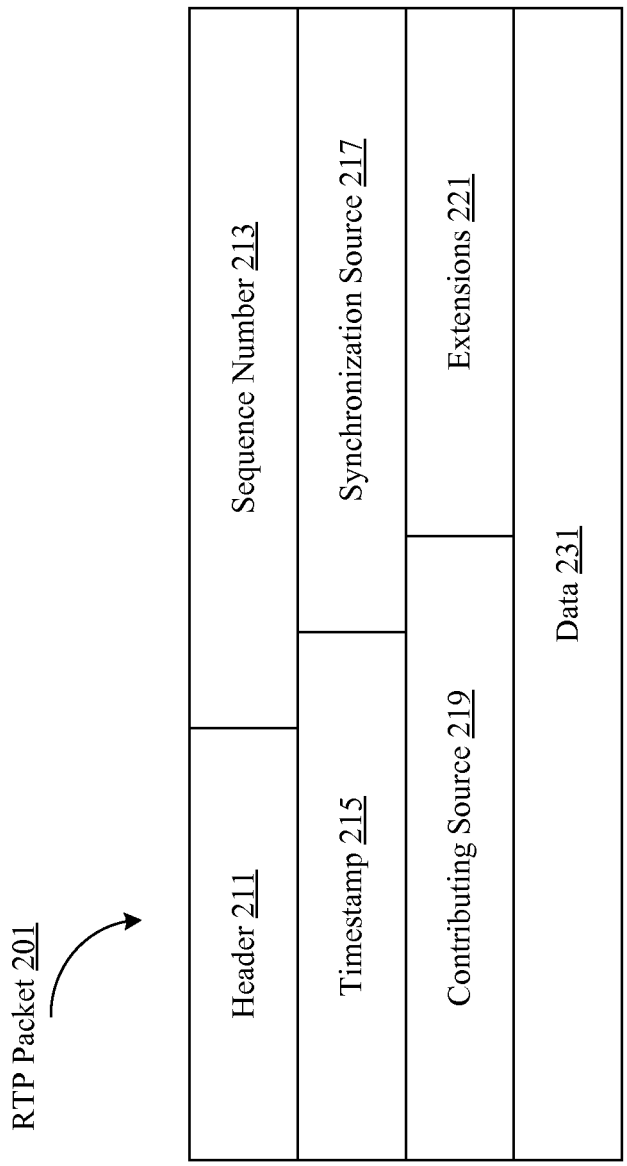
FIG. 2 illustrates one example of a Real-Time Transport Protocol (RTP) packet.

FIG. 2 illustrates one example of an RTP packet. An RTP packet 201 includes a header 211. According to various embodiments, the header 211 includes information such as the version number, amount of padding, protocol extensions, application level, payload format, etc. The RTP packet 201 also includes a sequence number 213. Client applications receiving RTP packets expect that the sequence numbers for received packets be unique. If different packets have the same sequence number, erroneous operation can occur. RTP packets also have a timestamp 215 that allows jitter and synchronization calculations. Fields 217 and 219 identify the synchronization source and the contributing source. Extensions are provided in field 221.

According to various embodiments, data 231 holds actual media data such as MPEG frames. In some examples, a single RTP packet 201 holds a single MPEG frame. In many instances, many RTP packets are required to hold a single MPEG frame. In instances where multiple RTP packets are required for a single MPEG frame, the sequence numbers change across RTP packets while the timestamp 215 remains the same across the different RTP packets. Different MPEG frames include I-frames, P-frames, and B-frames. I-frames are intraframes coded completely by itself. P-frames are predicted frames which require information from a previous I-frame or P-frame. B-frames are bi-directionally predicted frames that require information from surrounding I-frames and P-frames.

Because different MPEG frames require different numbers of RTP packets for transmission, two different streams of the same time duration may require different numbers of RTP packets for transmission. Simply replacing a clip with another clip would not work, as the clips may have different numbers of RTP packets and having different impacts on the sequence numbers of subsequent packets.

FIG. 3 illustrates one example of an RTP packet stream. An RTP packet stream 301 includes individual packets having a variety of fields and payload data. According to various embodiments, the fields include a timestamp 303, sequence 305, marker 307, etc. The packets also include payload data 309 holding MPEG frames such as I, P, and B-frames. Timestamps for different packets may be the same. In particular examples, several packets carrying portions of the same I-frame have the same time stamp. However, sequence numbers are different for each packet. Marker bits 307 can be used for different purposes, such as signaling the starting point of an advertisement.

According to various embodiments, packets with sequence numbers 4303, 4304, and 4305 carrying portions of the same I-frame and have the same timestamp of 6. Packets with sequence numbers 4306, 4307, 4308, and 4309 carry P, B, P, and P-frames and have timestamps of 7, 8, 9, and 10 respectively. Packets with sequence numbers 4310 and 4311 carry different portions of the same I-frame and both have the same timestamp of 11. Packets with sequence numbers 4312, 4313, 4314, 4315, and 4316 carry P, P, B, P, and B-frames respectively and have timestamps 12, 13, 14, 15, and 16. It should be noted that the timestamps shown in FIG. 3 are merely representational. Actual timestamps can be computed using a variety of mechanisms.

for many audio encodings, the timestamp is incremented by the packetization interval multiplied by the sampling rate. For example, for audio packets having 20 ms of audio sampled at 8,000 Hz, the timestamp for each block of audio increases by 160. The actual sampling rate may also differ slightly from this nominal rate. For many video encodings, the timestamps generated depend on whether the application can determine the frame number. If the application can determine the frame number, the timestamp is governed by the nominal frame rate. Thus, for a 30 f/s video, timestamps would increase by 3,000 for each frame. If a frame is transmitted as several RTP packets, these packets would all bear the same timestamp. If the frame number cannot be determined or if frames are sampled periodically, as is typically the case for software codecs, the timestamp may be computed from the system clock.

While the timestamp is used by a receiver to place the incoming media data in the correct timing order and provide playout delay compensation, the sequence numbers are used to detect loss. Sequence numbers increase by one for each RTP packet transmitted, timestamps increase by the time "covered" by a packet. For video formats where a video frame is split across several RTP packets, several packets may have the same timestamp. For example, packets with sequence numbers 4317 and 4318 have the same timestamp 17 and carry portions of the same I-frame.

FIG. 4 illustrates one example of content server buffers. According to various embodiments, devices 401, 411, 421, and 431 have individual buffers 403, 413, 423, and 433. Content server 451 includes channel buffers 453, 455, 457, 459, and 461. In particular embodiments, a content server 451 detects that a device has little or no data remaining in a buffer. A device such as a mobile device may have little or no data in a buffer when network conditions cause transmission delays and drop packets or when a device initially requests a media stream. To improve user experience, a content server 451 bursts available data for a requested stream to a device 411 having a low or empty buffer. In some examples, the content server 451 transmits data from channel buffer 455 to device 411 at double the usual transmission bit rate for a fixed number of seconds.

In other examples, the content server 451 transmits data from a low quality stream in channel buffer 453 to device 411. Transmitting a lower quality stream allows a buffer to be filled while maintaining the same transmission bit rate. For example, a stream in channel buffer 453 may be a 50 mbps stream while a stream in channel buffer 455 may be a 100 mbps stream. More frames from the lower quality stream can be transmitted to allow the device 411 to resume playback with decreased delay.

According to various embodiments, content server buffers may or may not be prefilled. In some examples, once a media stream has been requested, the corresponding channel buffer is filled at the content server. However, channel buffers corresponding to media streams not yet requested are typically not prefilled or prewarmed. Playback can be delayed while the content server channel buffers are filled. Consequently, the techniques and mechanisms of the present invention contemplate prefilling channel buffers. According to various embodiments, the content server channel buffers are prefilled using live streams from cable and satellite providers and continually refreshed with the most recent streaming data. In some instances, all channel buffers are prefilled. In other instances, selected channel buffers are prefilled and refreshed using satellite and cable media streams.

FIG. 5 illustrates one example of a mechanism for managing client capabilities. In particular embodiments, a client capability management database 501 holds client identifiers 511, 521, 531, 541, 551, and 561. The client identifiers may correspond to specific applications and/or devices. In particular embodiments, the client capability management database 501 also holds information about the media streams that are supported for a particular client. The media streams may be listed in prioritized order in fields 513, 523, 533, 543, 553, and 563. In particular embodiments, client capability information is also stored in field 515, 525, 535, 545, 555, and 565.

FIG. 6 illustrates multiple streams that may be selected based on characteristics such as screen size, memory size, processor speed, etc. An RTP packet stream 601 includes individual packets having a variety of fields and payload data. According to various embodiments, the fields include a timestamp 603, sequence 605, marker 607, etc. The packets also include payload data 609 holding MPEG frames such as I, P, and B-frames. Timestamps for different packets may be the same. In particular examples, several packets carrying portions of the same I-frame have the same time stamp. However, sequence numbers are different for each packet. Marker bits 607 can be used for different purposes, such as signaling the starting point of an advertisement.

According to various embodiments, packets with sequence numbers 4303, 4304, and 4305 carrying portions of the same I-frame have the same timestamp of 6. Packets with sequence numbers 4306, 4307, 4308, and 4309 carry P, B, P, and P-frames and have timestamps of 7, 8, 9, and 10 respectively. Packets with sequence numbers 4310 and 4311 carry different portions of the same I-frame and both have the same timestamp of 11. Packets with sequence numbers 4312, 4313, 4314, 4315, and 4316 carry P, P, B, P, and B-frames respectively and have timestamps 12, 13, 14, 15, and 16. It should be noted that the timestamps shown in FIG. 6 are merely representational. Actual timestamps can be computed using a variety of mechanisms.

RTP packet stream 611 includes timestamps 613, sequence numbers 615, markers 617, and data frames 619. The RTP packet stream may be tailored to clients that have larger screens but less memory. Or the RTP packet stream 611 may be coded different from packet stream 601. According to various embodiments, one of these streams may be selected for transmission to the client.

Figure 7:
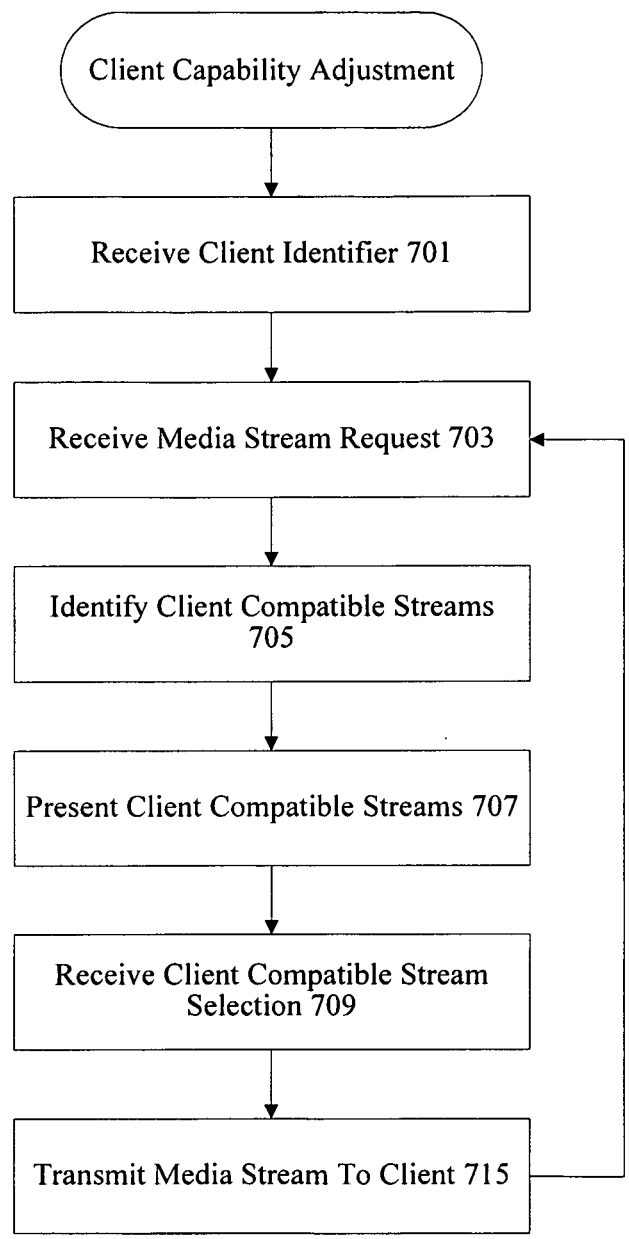
FIG. 7 illustrates one example of a technique for performing client capability management.

FIG. 7 illustrates one technique for performing client capability management. According to various embodiments, a client identifier is received at 701. In some examples, the client identifier is a user-agent field in an RTSP header. In other embodiments, other header fields may be associated with a client. At 703, a client device is identified. An application as well as a device running an application may be considered when selecting an optimal stream. At 705, client compatible streams are identified. In some embodiments, client compatible streams are presented to a user at 707 for selection. At 709, a user selection is received. In other examples, an optimal streams as determined by a content server is automatically selected. At 715, the content stream is transmitted to the client.

Figure 8:
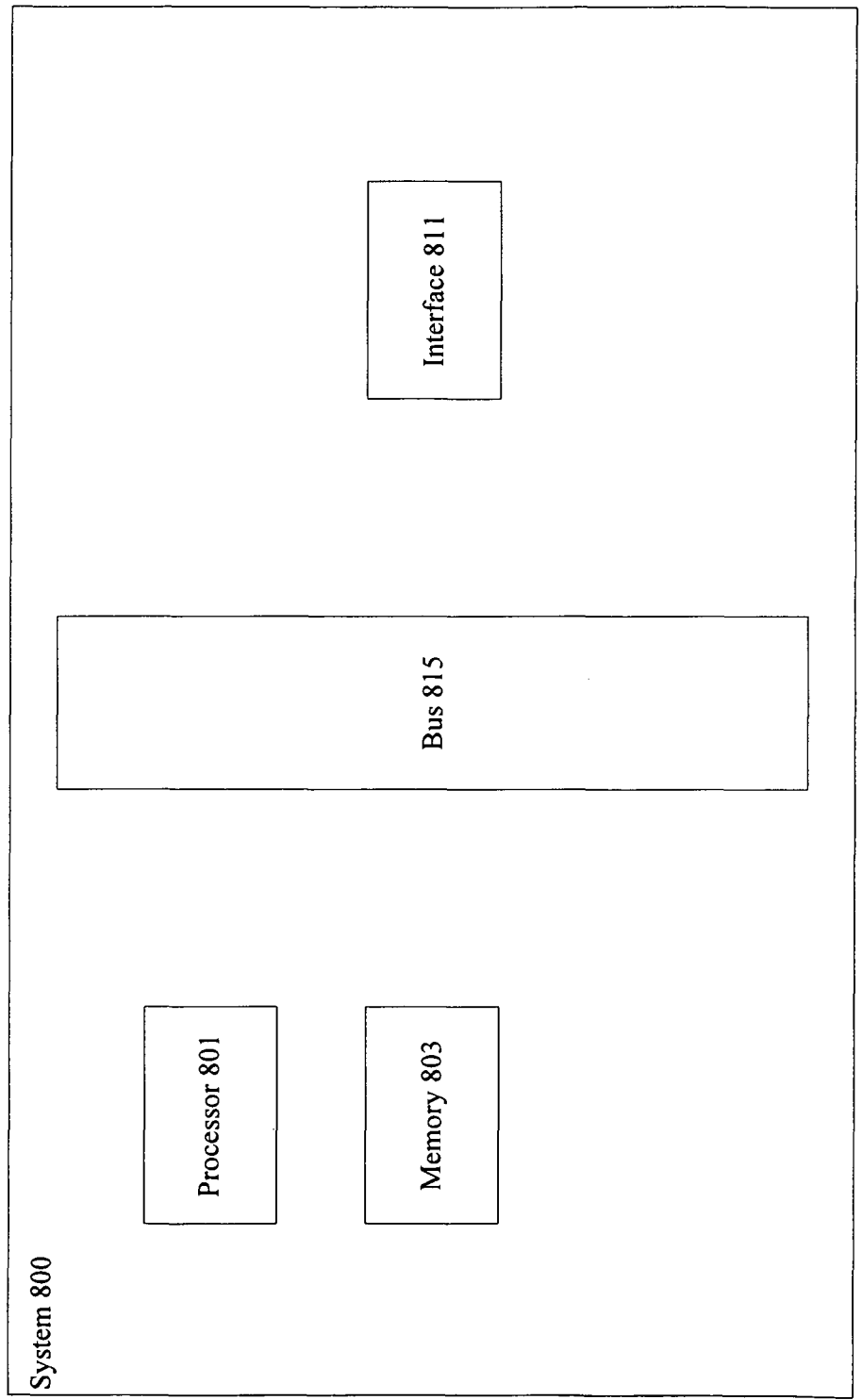
FIG. 8 illustrates one example of a system for processing media streams.

FIG. 8 illustrates one example of a content server. According to particular embodiments, a system 800 suitable for implementing particular embodiments of the present invention includes a processor 801, a memory 803, an interface 811, and a bus 815 (e.g., a PCI bus or other interconnection fabric) and operates as a streaming server. When acting under the control of appropriate software or firmware, the processor 801 is responsible for modifying and transmitting live media data to a client. Various specially configured devices can also be used in place of a processor 801 or in addition to processor 801. The interface 811 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 800 is a content server that also includes a transceiver, streaming buffers, and a program guide database. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 800 handles requests and responses for media content related transactions while a separate streaming server provides the actual media streams.

Although a particular content server 800 is described, it should be recognized that a variety of alternative configurations are possible. For example, some modules such as a report and logging module and a monitor may not be needed on every server. Alternatively, the modules may be implemented on another device connected to the server. In another example, the server 800 may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
   receiving a request from a client on a device to establish a session to receive a media stream from a content server;
   identifying capability characteristics including data burst support of the client, one or more memory limitations of the client, and codec support of the client, wherein data burst support of the client indicates whether the client supports buffer bursts;
   identifying a plurality of media streams compatible with the client based on the identified capability characteristics, each of the plurality of media streams maintained in a corresponding channel buffer;
   automatically selecting one of the plurality of media streams optimal for the client based on the identified capability characteristics including the data burst support, the memory limitations, and the codec support associated with the client; and
   transmitting the selected media stream to the client, wherein the selected media stream is transmitted at a bit rate determined at least in part based on the data burst support of the client.

2. The method of claim 1, wherein the identified capability characteristics includes screen size and video and audio codec support.

3. The method of claim 1, wherein a plurality of optimal media streams are selected.

4. The method of claim 1, wherein the identified capability characteristics include memory limitations and bandwidth limitations.

5. The method of claim 1, maintaining a client capability database at the content server.

6. The method of claim 1, wherein the plurality of media streams have different bandwidth characteristics.

7. The method of claim 1, wherein the media stream is a live media stream.

8. The method of claim 1, wherein the identified capability characteristics associated with the device are further obtained.

9. The method of claim 7, wherein the device receives the plurality of packets in order based on sequence number information.

10. The method of claim 1, wherein a plurality of live media streams are buffered in a plurality of channel buffers.

11. The method of claim 1, wherein the media stream is a Real-Time Transport Protocol (RTP) stream.

12. The method of claim 1, wherein the content server is connected over a network to a controller operable to establish a session with the device using a Real-Time Streaming Protocol (RTSP).

13. The method of claim 7, wherein the live media stream comprises a plurality of packets holding I-frames, P-frames, and B-frames.

14. A system, comprising:
   an interface operable to receive a request from a client on a device to establish a session to receive a media stream from a content server; and
   a processor operable to identify capability characteristics including data burst support, memory limitations, and codec support associated with the client and identify a plurality of media streams compatible with the client based on the identified capability characteristics, each of the plurality of media streams maintained in a corresponding channel buffer;

wherein one of the plurality of media streams optimal for the client is automatically selected based on the identified capability characteristics including the data burst support of the client, wherein data burst support of the client indicates whether the client supports buffer bursts, and wherein the interface is operable to transmit the selected media stream to the client at a bit rate determined at least in part based on the data burst support of the client.

15. The system of claim 14, wherein the identified capability characteristics include screen size and video and audio codec support.

16. The system of claim 14, wherein the identified capability characteristics include memory limitations and bandwidth limitations.

17. The system of claim 14, maintaining a client capability database at the content server.

18. The system of claim 14, wherein the plurality of media streams have different bandwidth characteristics.

19. The system of claim 14, wherein the media stream is a live media stream.

20. The system of claim 14, wherein the identified capability characteristics associated with the device are further obtained.

21. The system of claim 20, wherein the device receives the plurality of packets in order based on sequence number information.

22. The system of claim 14, wherein a plurality of live media streams are buffered in a plurality of channel buffers.

23. The system of claim 14, wherein the media stream is a Real-Time Transport Protocol (RTP) stream.

24. The system of claim 14, wherein the content server is connected over a network to a controller operable to establish a session with the device using a Real-Time Streaming Protocol (RTSP).

25. The system of claim 19, wherein the live media stream comprises a plurality of packets holding I-frames, P-frames, and B-frames.

26. An apparatus, comprising:
means for receiving a request from a client on a device to establish a session to receive a media stream from a content server;
means for identifying capability characteristics associated with the client including data burst support, memory limitations, and codec support;
means for identifying a plurality of media streams compatible with the client based on the identified capability characteristics, each of the plurality of media streams maintained in a corresponding channel buffer;
means for automatically selecting one of the plurality of media streams optimal for the client by using the identified capability characteristics including the data burst support of the client, wherein data burst support of the client indicates whether the client supports buffer bursts; and
means for transmitting the selected media stream to the client, wherein the selected media stream is transmitted at a bit rate determined at least in part based on the data burst support of the client.

* * * * *